Patented Feb. 29, 1944

2,342,798

UNITED STATES PATENT OFFICE 2,342,798

SEPARATION OF MINERAL OILS, TARS, AND FRACTIONS THEREOF

Karl Fischer, Berlin-Tempelhof, Germany; vested in the Alien Property Custodian

No Drawing. Application October 24, 1940, Serial No. 362,685. In Germany November 17, 1939

4 Claims. (Cl. 196—18)

The present invention relates to the separation of paraffin wax from mineral oils, such as petroleum oils, tars, tar oils, brown-coal distillation products or from oils containing crude waxes produced by other processes. More particularly, the invention concerns the removal of wax in a plurality of stages at different temperatures with the purpose of producing at elevated temperatures waxes of high melting point which, being substantially free from low melting waxy components, have an enhanced market value, and removing completely the lower melting waxy constituents at reduced temperatures for the production of low pour point oils.

Dewaxing processes are known whereby the removal of the wax is accomplished in several stages by adding to the wax bearing oil a diluent or solvent respectively, filtering the mixture to separate precipitated wax with a relatively high melting point, and chilling the filtrate for the complete precipitation of the other waxy components thus producing oils having a low cold test.

The function of the diluent was to break the viscosity of the chilled mixture and to aid the precipitation of the wax. The problem of providing a satisfactory dewaxing solvent allowing exclusively the removal of high melting waxes in the first stage but effecting the total precipitation of wax at lower temperatures is a difficult one. It is known to separate wax in more than one stage at different temperatures, using a solvent mixture containing a selective solvent with a preferred solvent power for the unsaturated mineral oil components and working as antisolvent for wax as for instance liquid sulphur dioxide, acetone, furfurol, methyl acetate and a diluent with a good solvent power for oil as well as for the selective solvent thus working as auxiliary solvent as benzol, its homologues, chlorinated hydrocarbons, ethers, alcohols. It has also been proposed to vary the solvent mixture composition in the different dewaxing stages, using in the first stage a higher percentage of selective solvent than in the following ones.

For the purpose of manufacturing low cold test lubricating oils from waxy stocks, these are treated, f. i. with a mixture consisting of 65 parts of benzol and 35 parts of liquid sulphur dioxide according to the Edeleanu process and cooled down to $-20°$ C. The wax separating out is filtered off at this temperature and an oil with a pour point of approximately $-15°$ C. is obtained.

The dewaxing processes conducted in the presence of selective solvents, as mentioned above, are also particularly advantageous because they can be applied combined with the extraction of crude oils or distillates with selective solvents. When extracting oils with a selective solvent such as liquid sulphur dioxide or furfurol a raffinate solution is obtained which contains the valuable saturated oil components, the wax and furthermore minor quantities of the selective solvent. This raffinate solution is easily dewaxed. After diluting it with an auxiliary solvent such as benzol, ethylene chloride or the like it may be cooled down to low temperatures and filtered. On the other hand, the waxfree oil obtained by dewaxing crude oils or distillates with a solvent mixture containing a selective solvent may be extracted afterwards by increasing the concentration of the selective solvent in the filtrate solution to an extent that a separation of the oil-diluent mixture into two layers occurs. After removal of the solvent from the upper layer a highly valuable and waxfree raffinate is obtained.

The present process solves the problem of obtaining the more valuable high melting wax in a separate fraction by effecting the dewaxing in two temperature stages and by applying the selective solvent, acting as anti-solvent for wax, mainly in the second stage. Therefore, according to the invention, a solvent mixture is used for the elimination of the low melting wax from the filtrate obtained in the first dewaxing stage that is richer in the selective solvent content than that used for the elimination of the high melting wax in the first stage.

As diluents for the first dewaxing stage of the new process are considered those with a good solvent power for oil components at the given temperatures, i. e., those acting in the way described above, giving the preference to solvents with a rather poor solvent power for wax. Above all, the following diluents belong to these solvents: Chlorinated and/or fluorinated hydrocarbons such as ethylene chloride, methylenedichloride, chloroform, dichlordifluormethane, furthermore alcohols as amyl alcohol, According to the invention the first dewaxing stage is also conducted in the presence of a selective solvent, for instance in the presence of liquid sulphur dioxide, the percentage proportion of which should, however, be much smaller in the first dewaxing stage than in the second one. This proportion is, according to the oil to be treated and the temperature applied, about 10–50% of the quantity applied in the second stage. If, for instance, for obtaining an oil with a low pour point in the second temperature stage a mixture of 60 parts per vol. of benzol to 40 parts per vol. of $SO_2$ proves to be favourable it will be advisable to apply 10–20 parts of $SO_2$ in the first stage at a precipitation temperature of 0° C. At —10° C. in the first stage of proportion of 5% of $SO_2$ in the solvent mixture will in some cases also be sufficient. If an oil is treated for which a sulphur dioxide proportion of only 20% suffices for the dewaxing to a low pour point, a proportion of 5–10% for the first stage at a precipitation temperature of 0° C. is considered to be adequate.

For the dewaxing of raffinates obtained by selective extraction, e. g., with liquid sulphur dioxide and still containing sulphur dioxide and perhaps certain amounts of the auxiliary solvent, the percentage of the auxiliary solvent, such as ethylene chloride, is increased to the required extent after complete or partial evaporation of the liquid sulphur dioxide. After the filtration in the first stage is accomplished, at temperatures between —10 and +10° C., liquid sulphur dioxide is again added to the filtrate thus increasing the anti-solvent power of the dewaxing agent. When cooling and filtration of the mixture is effected at approximately —20° C. an oil is obtained with a pour point near the filtration temperature.

When working with liquid sulphur dioxide the addition of it only in the second stage at reduced temperatures has the definite advantage that no filters working under pressure are needed as would be the case when working with $SO_2$ and mixtures containing $SO_2$ above —10° C.

The new process may also be applied to crude waxes obtained by other dewaxing processes and representing mixtures of higher and lower melting waxes and oil.

The following examples may be taken as an illustration of how to carry out the invention. The wax content of the basic material treated and of the finished wax was determined by Holde's gravimetric method and by the solidification point according to the rotating thermometer bulb method.

Example 1

A tar distillate produced by gas distillation of Silesian coal containing 4.87% of wax was split by means of liquid sulphur dioxide into extract and raffinate. The raffinate contained the entire wax. In order to obtain from it an oil with a low pour point and a marketable high melting wax separately from the lower melting wax the raffinate was freed from its content of sulphur dioxide except for the small amount dissolved therein, one and one half parts by volume, of ethylene chloride were added and the mixture cooled down to 0° C. The separated wax was filtered, the cake washed with two parts by volume of ethylene chloride and the filtrate diluted with 15% of $SO_2$ referring to the ethylene chloride contained in the filtrate. After cooling the mixture down to —20° C. and filtering it at the same temperature a soft cake containing wax was obtained, 28.4% of oil with a pour point of —20° C. were received after removal of the solvent.

The following table demonstrates the different kinds of wax obtained:

|  | Basic material $SO_2$ raffinate | Wax obtained at— | |
| --- | --- | --- | --- |
|  |  | 0° C. | —20° C. |
| Yield ------- weight per cent-- | 100 | 37.5 | 34.1 |
| Wax content ------------- do--- | 38.7 | 98.5 | 23.3 |
| Solidification point ------- ° C-- | 39 | 52 | 20 |

Example 2

A slack wax obtained from brown-coal tar was dewaxed at 0° C. with dichlor-ethane ($C_2H_4Cl_2$) for the removal of the hard wax. A wax yield of 47%, referred to the basic stock, with a solidification point of 50.5° C. was obtained. Altogether six parts by volume of solvent were applied (to the solution and the washing). The filtrate from the first dewaxing stage was mixed with 16% of $SO_2$ referred to the dichlor-ethane contained in the filtrate, cooled to —20° C. and filtered at the same temperature. The filter cake was washed with two parts by volume of a mixture of dichlorethane and sulfur-dioxide, the same proportion of the solvent components being used as in the dewaxing stage. After having freed the cake and the filtrate of the solvents by evaporation, 20% of a soft wax with a solidification point of 28.5° and 33% of oil were obtained, the pour point of which was —14° C.

Example 3

In a comparison test dichlor-ethane plus $SO_2$ (mixing ratio 95:5) were applied to the same amount of solvent as in Example 2. The filtration was conducted at a temperature of 5° C. A wax yield of 52.3% with a solidification point of 50° C. was obtained. The addition of 5% liquid $SO_2$ to the diluent in this test increased the yield of wax, therefore, from 47 to 52.3%. The filtrate of the first dewaxing stage was treated according to Example 2. The yield of soft wax with the solidification point of 27° C. was 28%.

Example 4

A raffinate obtained by extraction of a brown-coal tar distillate by means of $SO_2$ at —15° C. containing about 40% by weight of wax was finished in the same way as described in Examples 1 and 2. In the first stage the dewaxing was accomplished by applying 80% by volume of ethylene chloride as dewaxing agent and one part by volume of ethylene chloride as washing liquid at —5° C. and in the second stage by adding 15% of $SO_2$, referring to ethylene chloride, at —20° C.

In the first stage 33.6% by weight of wax were obtained with a solidification point of 50° C. and a wax content of 96% by weight; in the second stage, 13.6% by weight of wax with a solidification point of 31° C. and a wax content of 72% by weight; furthermore 52.8% of waxfree oil were obtained with a pour point of —17° C.

Example 5

A re-distillate obtained from brown-coal tar was treated with liquid sulphur dioxide in countercurrent. From the raffinate solution received during this operation the solvent was evaporated. The mass having a wax content of 56.3 weight percent was dewaxed by filtration at +5° C. after diluting it with two parts by volume of ethylene chloride. A quantity of 30% of methyl alcohol was added to the filtrate referring to the ethylene chloride contained therein. The mixture was cooled down to −20° C. and filtered at that temperature. After recovery of the solvent the filtrate showed a pour point of −16° C. The yields and qualities of the waxes obtained are tabulated below:

|  | High melting wax | Low melting wax |
|---|---|---|
| Yield_____weight per cent__ | 37 | 27.9 |
| Wax content_____do____ | 98.5 | 78.8 |
| Solidification point_____° C__ | 50 | 29 |

Example 6

The experiment described in Example 5 was conducted by applying acetone instead of methyl alcohol. The results obtained were as follows:

|  | High melting wax | Low melting wax |
|---|---|---|
| Yield_____weight per cent__ | 38.3 | 23 |
| Wax content_____do____ | 98.5 | 79.4 |
| Solidification point_____° C__ | 50 | 30.7 |

After the second filtration the oil had a pour point of −12° C.

Example 7

A raffinate with a solidification point of 34.5° C., a wax content of 51.8% by weight and a density of 0.7832 obtained by selective extraction of a brown-coal tar distillate, was diluted with two parts by volume of a mixture consisting of benzol and $SO_2$, its mixing ratio being 90:10, and the mixture then filtered at +5° C. The cake was washed with two parts by volume of the same solvent mixture. The filtering rate was 85 kgs./sqm./h. After recovery of the solvent a quantity of 20.8% of wax with a solidification point of 54.0° C. was obtained, showing a pure white colour after treatment with 5% sulphuric acid at 180° C. and 5% clay.

The filtrate from the first dewaxing operation was now diluted with liquid sulphur dioxide, its proportional amount in the solvent mixture being 40%. The mixture was then cooled down to −20° C. and filtered while the filter cake was washed with two parts by volume of a washing liquid consisting also of 60 parts of benzol and 40 parts of $SO_2$. The filtering rate was 108 kgs./sqm./h. After separation of the solvent 30% by weight of wax were obtained with a solidification point of 39° C. When the filtrate was freed from the solvent it showed a pour point of −11° C.

Example 8

A raffinate with a wax content of 56.3% by weight obtained from brown-coal tar distillate by treatment with liquid sulphur dioxide in counter current was diluted with two parts by volume of a mixture consisting of 90 parts of ethylene chloride and 10 parts of acetone, and the mixture filtered at +5° C. After washing the filter cake with two parts by volume of the same solvent mixture 38.5% by weight of wax were obtained with a solidification point of 50° C. and a wax content of 97.5% by weight. Further amounts of acetone were added to the filtrate until the volume ratio of ethylene chloride : acetone was 60:40. After cooling the mixture down to −20° C. it was filtered and the filter cake washed with two parts by volume of the same solvent mixture. A wax of 20.2% by weight with a melting point of 30.5° C. was obtained. After recovery of the solvents the filtrate had a pour point of −11° C.

The same raffinate was diluted according to a known process mentioned above in a parallel experiment with two parts by volume of pure acetone and the mixture filtered at +5° C. After washing the cake with acetone and separating the acetone from the filter cake by evaporation 77% by weight of wax with the solidification point of only 39.5° C. and a wax content of only 75.4% by weight were obtained.

By the term "diluents" as used in the claims solvents are meant with a good solvent power for the liquid constituents of the raw stock as for instance benzol, ethylene chloride and amyl alcohol, such solvents being preferred with a limited solvent power for wax, and by "selective solvents" solvents are meant with a preferred solvent power for aromatic and unsaturated constituents and which function as anti-solvent for wax, for instance liquid sulphur dioxide, acetone, furfurol, methyl alcohol.

Having thus described and illustrated my invention what I claim is:

1. A process for the separation of mineral oils, tars and fractions thereof into oils with a low pour point and into higher and lower melting waxes by dewaxing the basic material in two temperature stages wherein a diluent is added to the oil to be dewaxed prior to the first wax cake recovery stage and a selective solvent is applied in both stages as wax anti-solvent, characterized by the feature that the low melting wax is separated from the filtrate of the first dewaxing stage by means of a solvent mixture that is richer in the selective solvent content than that applied for the precipitation of the high melting wax in the first stage.

2. A process for the separation of mineral oils, tars and fractions thereof into oils with a low pour point and into higher and lower melting waxes by means of filtration in two temperature stages wherein a diluent is added to the oil to be dewaxed prior to the first wax cake recovery stage and a selective solvent is applied therewith as wax anti-solvent, characterized by the feature that the solvent mixture used for the precipitation of the low melting wax from the filtrate of the first dewaxing stage contains 10 to 40% by volume of the selective solvent as compared with a lesser proportionate amount in the diluent and solvent mixture contained in the first filtrate.

3. A process for the separation of mineral oils, tars and fractions thereof into oils with a low pour point and into higher and lower melting waxes by means of filtration in two temperature stages wherein a diluent is added to the oil to be dewaxed prior to the first wax recovery stage and a selective solvent is applied in both stages as wax anti-solvent, characterized by the feature that the proportionate amount of the selective solvent in the solvent mixture applied to the first dewaxing stage is 10 to 50% of the proportionate amount of the selective solvent in the solvent mixture applied to the second stage.

4. A process for the separation of slack waxes into higher and lower melting waxes and into oils with a low pour point according to the process described in claim 1.

KARL FISCHER.